Jan. 5, 1971 G. M. MIERLEY, SR 3,552,753
HIGH EFFICIENCY STATIC SEAL ASSEMBLY
Filed June 26, 1968 2 Sheets-Sheet 1

WITNESSES
Robert C. Baird
James F. Young

INVENTOR
George M. Mierley, Sr.
BY
Frank Cistrano Jr.

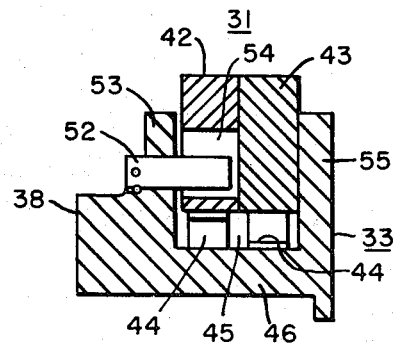
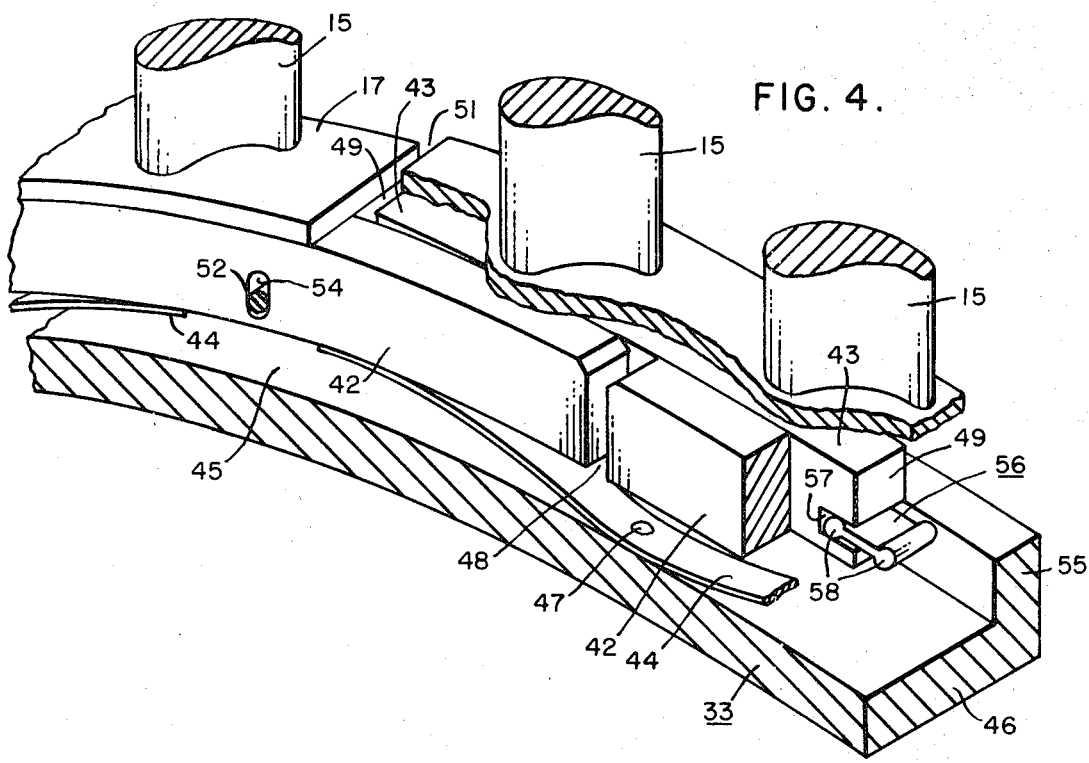

3,552,753 
Patented Jan. 5, 1971

---

3,552,753
HIGH EFFICIENCY STATIC SEAL ASSEMBLY
George M. Mierley, Sr., Wilmington, Del., assignor to Westinghouse Electric Corporation, Pittsburgh, Pa., a corporation of Pennsylvania
Filed June 26, 1968, Ser. No. 740,219
Int. Cl. F16j 9/24, 15/00
U.S. Cl. 277—137                            6 Claims

ABSTRACT OF THE DISCLOSURE

An annular static shield is provided at the entrance to the stator of an axial flow turbine. The seal includes two adjacent spring loaded segmented rings so arranged in a seal housing that the gaps between segments of the high pressure ring overlap the gaps between segments of the low pressure ring. The segments of the low pressure ring are oriented circumferentially to be in line with the gaps in the inner shroud of a stator vane segment. Thus, a radial offset between two adjacent shroud ends will not push the segments of the low pressure seal away from contact with the shroud sealing surface.

BACKGROUND OF THE INVENTION

This invention relates, generally, to elastic fluid machines and, more particularly to static seals for gas turbines.

In an axial flow gas turbine, a static seal is provided at the stator entrance which cooperates with the inner shroud of the first row of stationary vanes or blades to prevent leakage of the hot elastic fluid past the blades. A prior seal comprised only a single segmented ring which did not seal properly due to radial offsets in the stator inner shroud. The offsets are the results of unequal vane expansion caused by hot spots.

An object of this invention is to provide a static seal which is more efficient than prior static seals.

Another object of the invention is to provide a seal which is not adversely affected by unequal expansion of the stator shroud segments with which the seal cooperates.

Other objects of the invention will be explained fully hereinafter or will be apparent to those skilled in the art.

SUMMARY OF THE INVENTION

In accordance with one embodiment of the invention, at least two spring loaded segmented rings are so arranged side-by-side in a generally channel-shaped annular housing that the gaps between segments of the ring on the high pressure side of the seal overlap, i.e. are staggered with, the gaps between segments of the ring on the low pressure side of the seal. The segments of the low pressure ring are oriented circumferentially to be in line with the gaps between segments of the stator inner shroud with which the seal cooperates. Thus, a radial offset between two adjacent shroud ends will not push the segments of the low pressure seal away from contact with the shroud sealing surface. Only the high pressure segments will be pushed away by the offset and leakage caused thereby goes into a cavity underneath the seal rings. Seal keys between low pressure segments prevent leakage from the cavity through the gaps in the low pressure ring.

BRIEF DESCRIPTION OF THE DRAWINGS

For a better understanding of the nature and objects of the invention, reference may be had to the following detailed description, taken in conjunction with the accompanying drawings, in which:

FIG. 3 is an enlarged detail view, in section, taken along the line III—III in FIG. 2; and FIG. 4 is an isometric view, partly in section, of a portion of the seal structure and associated stator structure.

DESCRIPTION OF THE PREFERRED EMBODIMENT

Figure 1:
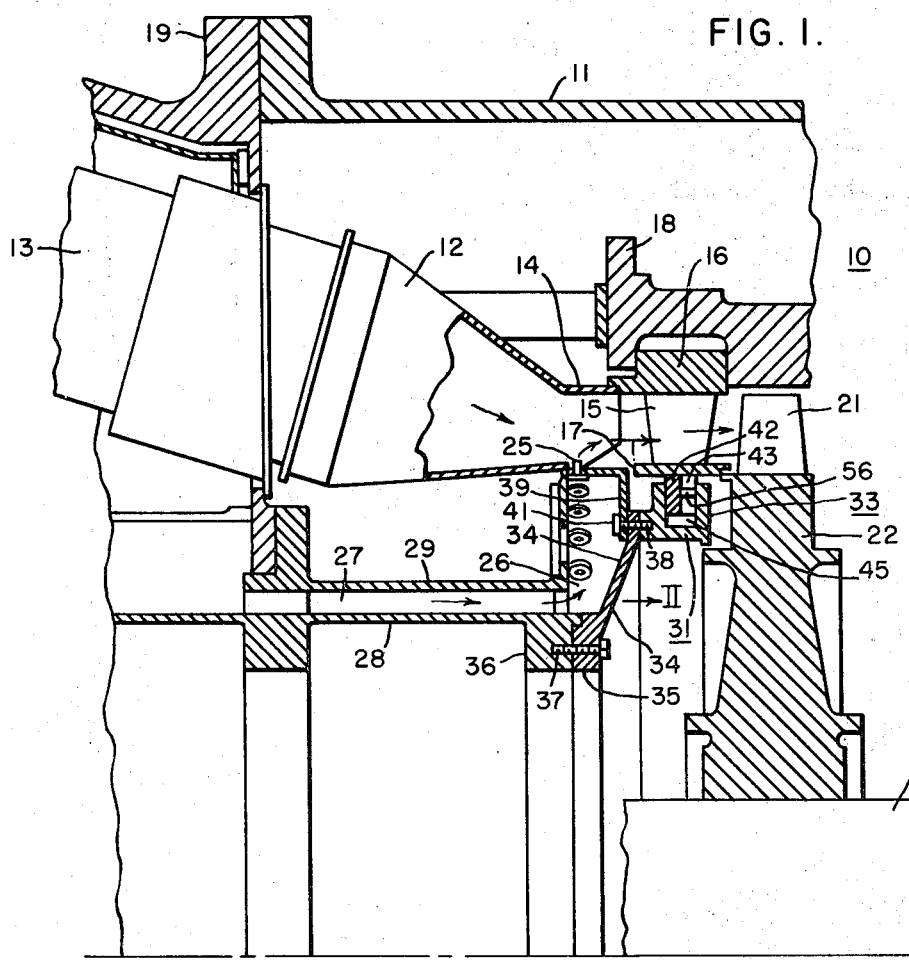
FIG. 1 is a view, partly in longitudinal section and partly in elevation, of a portion of an axial flow gas turbine with an annular seal structure constructed in accordance with principles of the present invention.

Referring to the drawings, particularly to FIG. 1, there is shown a portion of an axial flow gas turbine 10 which includes a generally tubular outer casing 11 enclosing a plurality of circumferentially spaced transition members 12 disposed to receive hot motive gas from a corresponding plurality of circumferentially spaced combustion chambers 13. The transition members 12 have end portions 14 axially spaced from an annular array of circumferentially spaced stationary blades or vanes 15 secured between arcuate outer shroud segments 16 and arcuate inner shroud segments 17. The outer shroud segments 16 are mounted in a stator blade ring 18 disposed inside the casing 11. The combustion chambers 13 are mounted in a housing 19 attached to the casing 11.

An annular array of rotor blades 21 are disposed immediately downstream from the stationary blades 15. The rotor blades 21 are suitably attached to the periphery of a rotor wheel 22 secured to a shaft 23. The turbine may include other stationary and rotary blades disposed downstream from the blades 21. The transition members 12 provide arcuate passageways or channels 24 for directing the flow of hot gas from the combustion chambers 13 to the blades 15 and 21. The rotor 22 and the shaft 23 are driven by the energy extracted from the hot elastic fluid in a manner well known in the art.

Compressed coolant fluid may, if desired, be introduced into the passageway 24 through a plurality of circumferentially spaced tubular shaped nozzles 25 associated with an annular plenum chamber 26 adapted to receive a flow of pressurized fluid from a suitable source, such as a compressor (not shown). The compressed fluid is directed to the plenum chamber 26 through an axially extending passage 27 formed between a wall 28 of a torque tube housing through which the shaft 23 extends and an axially extending wall 29 of the plenum chamber 26.

Figure 2:
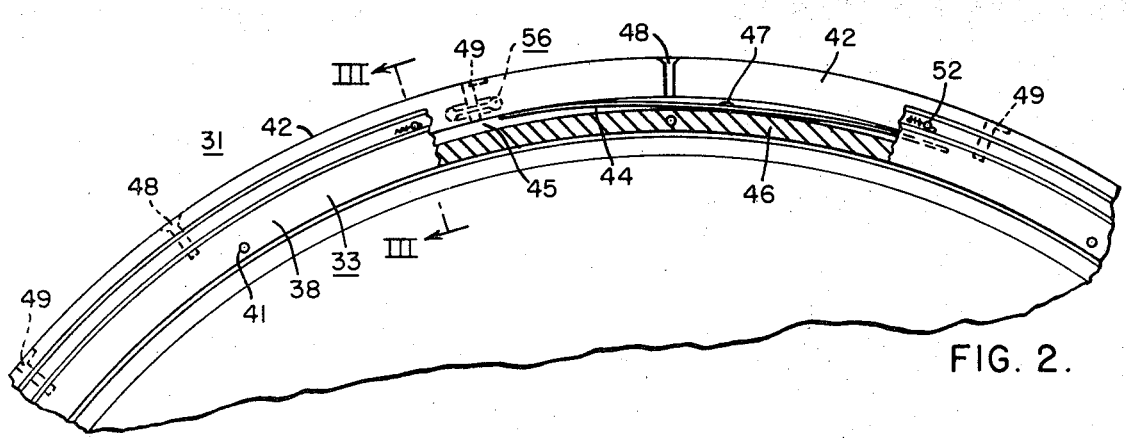
FIG. 2 is an enlarged view, partly in section and partly in side elevation, of a portion of the annular seal structure, taken along the line II—II in FIG. 1.

In order to minimize the leakage of the elastic fluid around the stationary vanes or blades 15, a static seal structure 31 is provided to cooperate with the inner shroud segments 17 of the stator structure. As shown in FIGS. 1, 2 and 3, the static seal structure 31 comprises an annular housing 33 which is generally channel-shaped in cross section and is supported inside the inner shroud segments 17 by a disk or ring 34 having a relatively thick inner rim 35 attached to a flange 36 on the torque tube housing 28 by bolts 37. The outer rim of the disk 34 is attached between an annular shoulder 38 on the housing 33 and a wall 39 of the plenum chamber 26 by means of bolts 41. Thus, the disk 34 forms a portion of the enclosure for the plenum chamber 26.

The seal structure 31 includes at least two segmented rings 42 and 43 disposed in mutually abutting side-by-side relation in the channel-shaped housing 33. The rings 42 and 43 are separately biased radially outwardly by leaf springs 44 disposed in a cavity 45 defined between the bottom 46 and the side walls 53 and 55 of the channel-shaped housing 33. As shown in FIGS. 2 and 4, the springs 44 may be attached to the bottom wall 46 of the housing 33 by means of pins 47. In this manner, the segmented rings 42 and 43 are biased into engagement with the inner shroud segments 17 of the stator structure.

As shown more clearly in FIG. 4, the spring loaded segmented rings 42 and 43 are so arranged that gaps 48 between segments of the ring 42 on the high pressure side of the seal are staggered with gaps 49 between segments of the ring 43 on the low pressure side of the seal. Also, the segments of the low pressure ring 43 are oriented circumferentially so that they are in radial alignment with gaps 51 in the stator inner shroud 17. Thus, a radial offset between two adjacent shroud segment ends (as occasioned by uneven blade expansion) will not push the segments of the low pressure seal ring 43 away from contact with the shroud sealing surface. The segments of the high pressure ring 42 are the only ones that will be pushed away by the offset between segments of the stator inner shroud.

As shown more clearly in FIG. 3, limited radial movement of the segments of the high pressure ring 42 is permitted by pins 52 each one of which extends through the wall 53 of the housing 33 into a radially elongated opening 54 in a segment of the ring 42. The opening 54 is also shown in FIG. 4. Likewise, limited radial movement of the the segments of the low pressure ring 43 is permitted by pins (not shown), similar to the pins 52, which extend through the wall 55 of the housing 33 into elongated openings in the segments of the ring 43 similar to the openings 54. Thus, the radial movement of the segments of ring 42 is independent of the radial movement of the segments of ring 43.

The offsets in the inner shroud segment 17 are caused by unequal expansion of the vanes or blades 15 which results from hot spots in the vane structure which may be caused by unequal heating of the combution chambers 13. The leakage past the segments of the high pressure ring 42 caused by the offsets in the stator inner shroud can only go into the cavity 45 underneath the seal rings 42 and 43. The leakage of the fluid from the cavity 45 through the gaps 49 in the low pressure seal ring 43 is prevented by seal keys 56 which bridge the gaps 49 between the segments of the low pressure ring 43 and received in slots 57 in the segments. The seal key 56 are preferably of dumb-bell shape with rounded end portions 58 to permit rocking movement of adjacent seal members 43. In this manner, the efficiency of the static seal structure 31 is improved as compared with prior static seals.

The static seal structure herein described is particularly suitable for utilization in axial flow gas turbines. However, the seal assembly is not limited to such applications and may be utilized in other structures for preventing leakage of a fluid from a high pressure region on one side of the seal to a lower pressure region on the other side of the seal.

Since numerous changes may be made in the above-described construction and different embodiments of the invention may be made without departing from the spirit and scope thereof, it is intended that all subject matter contained in the foregoing description or shown in the accompanying drawing shall be interpreted as illustrative and not in a limiting sense.

I claim as my invention:

1. A static seal structure for controlling leakage of a fluid between high and low pressure regions comprising,
    an annular housing generally channel-shaped in cross section,
    at least two segmented rings disposed side-by-side in the housing with gaps between segments,
    the gaps between segments of the ring on the high pressure side of the seal being staggered with the gaps between segments of the ring on the low pressure side of the seal,
    means permitting limited radial movement of the segments of one ring independently of the segments of the other ring,
    resilient means biasing said segments radially, and
    seal keys bridging the gaps between the segments of the ring at one side of the seal,
    said seal keys being of dumbell-shape and disposed in slots in the ends of neighboring segments of the ring at the low pressure side of the seal.

2. In an elastic fluid machine, in combination,
    a stator having an annular array of stationary vanes secured between inner and outer shroud segments with gaps formed between adjacent inner segments,
    an annular housing disposed inside the inner shroud segments,
    said housing being generally channel-shaped in cross section,
    at least two segmented seal rings disposed in mutually abutting side-by-side relation in the housing with gaps between adjacent ring segments,
    means permitting limited radial movement of the segments of one ring independently of the segments of the other ring, and
    resilient means biasing said ring segments radially into contact with the inner shroud segments to prevent fluid leakage between high and low pressure regions at opposite sides of the seal rings.

3. The combination defined in claim 2, wherein
    the gaps between segments of the ring on the high pressure side of the rings are staggered with the gaps between segments of the ring on the low pressure side of the rings.

4. The combination defined in claim 3, wherein
    the gaps between segments of the ring on the low pressure side are in radial alignment with the gaps between segments of the inner shroud to permit an inner shroud segment to depress a ring segment on the high pressure side without depressing a ring segment on the low pressure side.

5. The combination defined in claim 2, including
    seal keys bridging the gaps between adjacent segments of the ring on the low pressure side of the rings.

6. The combination defined in claim 4, wherein the housing has bottom and side walls defining a cavity between the bottom and the seal rings for receiving fluid leaking past a depressed ring segment on the high pressure side, and further including means permitting radial movement of the segments but restraining circumferential movement of the segments.

References Cited

UNITED STATES PATENTS

| | | | |
|---|---|---|---|
| 407,370 | 7/1889 | Peacock | 277—137 |
| 2,449,375 | 9/1948 | Ferguson et al. | 277—161 |
| 2,867,458 | 1/1959 | Kroekel | 277—137 |
| 2,908,516 | 10/1959 | Stein | 277—137 |

SAMUEL ROTHBERG, Primary Examiner

U.S. Cl. X.R.

277—154, 156, 161